United States Patent
Ito et al.

(10) Patent No.: US 6,810,858 B2
(45) Date of Patent: Nov. 2, 2004

(54) FUEL INJECTION TIMING CONTROL APPARATUS AND CONTROL METHOD THEREOF FOR IN-CYLINDER INJECTION GASOLINE ENGINE

(75) Inventors: Yukikazu Ito, Nishikamo-gun (JP); Kiyoo Hirose, Nagoya (JP); Koji Honda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/414,243

(22) Filed: Apr. 16, 2003

(65) Prior Publication Data

US 2003/0200952 A1 Oct. 30, 2003

(30) Foreign Application Priority Data

Apr. 26, 2002 (JP) ........................................ 2002-163578

(51) Int. Cl.[7] .......................... F02D 41/04; F01M 11/00
(52) U.S. Cl. ................. 123/478; 123/196.005; 123/294
(58) Field of Search .......................... 123/196 R, 196 S, 123/294, 295, 305, 501, 502, 478, 494

(56) References Cited

FOREIGN PATENT DOCUMENTS

| JP | 10-317936 | * 12/1998 |
| JP | 2001-304026 A | 10/2001 |
| JP | 2002-13428 A | 1/2002 |

* cited by examiner

*Primary Examiner*—Tony M. Argenbright
(74) *Attorney, Agent, or Firm*—Kenyon & Kenyon

(57) ABSTRACT

A fuel injection mode is flexibly controlled according to the actual extent of adverse effects on an internal combustion engine from both deterioration of exhaust gas emissions and fuel dilution caused by fuel adhering to the piston top face and the cylinder inner peripheral face. A dilution degree counter value C is counted up when a coolant temperature at engine startup THWST and an intake air quantity sum value after engine startup GASUM are each equal to, or less than, respective predetermined values. A fuel dilution flag is set to "ON" when the dilution degree counter value C is equal to, or greater than, a predetermined value CH. A fuel injection timing of an intake stroke injection is changed to a timing on the advance side when this fuel dilution flag is "ON."

15 Claims, 6 Drawing Sheets

FUEL INJECTION TIMING CONTROL APPARATUS AND CONTROL METHOD THEREOF FOR IN-CYLINDER INJECTION GASOLINE ENGINE

INCORPORATION BY REFERENCE

The disclosure of Japanese Patent Application No. 2002-163578 filed on Apr. 26, 2002, including the specification, drawings and abstract is incorporated herein by reference in its entirety.

BACKGROUND OF THE INVENTION

1. Field of the Invention

This invention relates to a fuel injection timing control apparatus for an in-cylinder injection internal combustion engine, which controls a fuel injection in an in-cylinder injection internal combustion engine in which fuel is directly injected into a cylinder.

2. Description of the Related Art

In the past, an in-cylinder injection internal combustion engine in which fuel is directly injected into a cylinder of the internal combustion engine has been proposed. This in-cylinder injection internal combustion engine aims to improve fuel economy and the like by precisely controlling the mixture state of a mixture within the cylinder by injecting fuel late in the compression stroke. In this in-cylinder injection internal combustion engine, however, the following problems may occur, particularly when the engine is cold, when the fuel is directly injected into the cylinder.

That is, when the engine is cold, fuel within the cylinder does not readily atomize, resulting in a tendency for a large amount of the injected fuel to adhere to the top face of an engine piston (hereinafter referred to simply as "piston top face") and the cylinder inner peripheral face. Therefore, ordinarily when the engine is cold, the fuel injection timing is set to during the intake stroke (hereinafter referred to as "intake stroke injection"), thus increasing the time between fuel injection and ignition to as long as possible to promote atomization of the injected fuel. Even if this intake stroke injection is performed, however, it is still difficult to completely prevent the adherence of fuel on the piston top face and cylinder inner peripheral face; some of the injected fuel is not burned, but remains adhered after engine combustion.

The fuel adhered to the piston top face, in particular, atomizes gradually during later engine combustion, and is discharged from the cylinder without being completely combusted, leading to a deterioration of exhaust gas emissions, such as the generation of black smoke and an increase in unburned components.

The fuel adhered to the cylinder inner peripheral face mixes with lubricating oil adhered to the cylinder inner peripheral face in order to provide lubrication for the piston. As a result, the lubricating oil is diluted by the fuel and so-called fuel dilution occurs. The lubricating oil in the cylinder that has been diluted by the fuel is scraped down the cylinder inner peripheral face from the reciprocating motion of the piston and returned to the oil pan, after which it is again supplied to the internal combustion engine to provide lubrication. Therefore, if fuel dilution of the lubricating oil occurs frequently, the ratio of fuel mixed in with the overall lubricating oil gradually increases until finally adverse effects result, such as a decline in the lubricating performance in the internal combustion engine.

Japanese Patent Laid-Open Publication No. 2001-304026 and Japanese Patent Laid-Open Publication No. 2002-13428 disclose related art in which the fuel injection timing during the intake stroke injection is set taking into consideration the distribution of the amounts of fuel adhered to the piston top face and the cylinder inner peripheral face from the fuel injection so that only one of the amounts of the adhered fuel does not increase to an extreme in order to deal with both deterioration in exhaust gas emissions and fuel dilution.

Therefore, even if the lubricating oil is diluted by the fuel following an injection of fuel into the cylinder when the engine is cold, that fuel dilution is only temporary, and unless it occurs frequently, the ratio of fuel contained in the lubricating oil to the overall lubricating oil will not change much. Further, the fuel contained in the lubricating oil decreases by gradually evaporating over time. Therefore, despite the possibility of adverse effects described above, such as a reduction in lubricating performance, ultimately caused by fuel dilution, if fuel dilution of the overall lubricating oil is at a level where it is not progressing, the adverse effects are also in a range where they can actually be effectively ignored. That is, a certain degree of fuel dilution of the lubricating oil that occurs from the injection of fuel into the cylinder can be allowed when considering the fact that the degree of the adverse effects on the internal combustion engine that are caused by that degree of fuel dilution is negligible.

On the other hand, deterioration of the exhaust gas emissions due to fuel adhered to the piston top face is to a great extent unavoidable, and the allowable range in consideration of the degree of the adverse effects on the internal combustion engine is extremely narrow.

Therefore, although fuel dilution due to an increase in fuel adhering to the cylinder inner peripheral face is allowable to some degree, it is preferable, or realistic, when fuel dilution of the overall lubricating oil is not effectively progressing, to inhibit the deterioration of the exhaust gas emissions by changing the fuel injection timing or the like so as to reduce as far as possible the amount of fuel that adheres to the piston top face.

Although the art in the foregoing publications performs fuel injection control considering both deterioration of the exhaust gas emissions due to fuel adhering to the piston top face and fuel dilution of the lubricating oil due to fuel adhering to the cylinder inner peripheral face, there still remains room for improvement with respect to flexibly dealing with these problems according to the actual degree of adverse effects they have on the internal combustion engine.

SUMMARY OF THE INVENTION

In view of this room for improvement with the related art, it is an object of this invention to provide a fuel injection control apparatus for an in-cylinder injection internal combustion engine, which can flexibly control a fuel injection mode according to an actual degree of adverse effects on the internal combustion engine from both deterioration of exhaust gas emissions caused by fuel adhering to a piston top face and fuel dilution caused by fuel adhering to a cylinder inner peripheral face.

Hereinafter, a method for solving the foregoing problems, as well as an effect of that method, will be described. According to one aspect of the invention, a fuel injection control apparatus for an in-cylinder injection internal combustion engine, in which fuel is directly injected into a cylinder of the internal combustion engine, is provided with a dilution degree estimation portion that estimates a degree of dilution by fuel in an overall lubricating oil provided to lubricate the internal combustion engine, and a control portion that controls a fuel injection mode so as to inhibit dilution by fuel of the lubricating oil when the estimated degree of fuel dilution is larger than a predetermined value.

According to this construction, when the degree of fuel dilution of the overall lubricating oil is small, for example, it is possible to give priority to suppressing the adhesion of fuel on the piston top face in order to inhibit, to as great an extent as possible, deterioration of the exhaust gas emissions, such as the generation of black smoke, and temporarily allow a fuel injection even if that fuel injection would increase the amount of fuel adhered to the cylinder inner peripheral face and cause the fuel dilution to progress. In contrast, when the degree of fuel dilution of the overall lubricating oil increases to the point where, if it progresses any farther the resultant adverse effects, such as a decline in lubricating performance, can no longer be ignored, the fuel injection mode is controlled so as to inhibit dilution by fuel of the lubricating oil. As a result, it is possible to inhibit adverse effects from the fuel dilution of the lubricating oil on the internal combustion engine.

Therefore, the fuel injection mode can be flexibly controlled according to the actual degree of adverse effects on the internal combustion engine from both the deterioration of the exhaust gas emissions caused by fuel adhesion on the piston top face and fuel dilution caused by fuel adhesion to the cylinder inner peripheral face. Accordingly, it is possible to effectively inhibit deterioration of the exhaust gas emissions and fuel dilution.

As a specific example when controlling the fuel injection mode so as to inhibit dilution by fuel of the lubricating oil in this way, the control portion of the fuel injection control apparatus for an in-cylinder injection internal combustion engine may change the fuel injection timing as the fuel injection mode so as to inhibit fuel dilution.

There is a correlation between the amount of fuel adhered to the piston top face and the piston position when the fuel is injected, as well as between the amount of fuel adhered to the cylinder inner peripheral face and the piston position when the fuel is injected, in which those amounts tend to change greatly depending on the position of the piston.

That is, as the piston moves toward top dead center when the fuel is injected, the area of the cylinder inner peripheral face covered by the piston increases, while the distance between the piston top face and the nozzle hole of the fuel injection valve decreases. As a result, the amount of fuel adhered to the cylinder inner peripheral face decreases, but the amount of fuel adhered to the piston top face increases.

In contrast, as the piston moves toward bottom dead center when the fuel is injected, the distance between the piston top face and the nozzle hole of the fuel injection valve increases, while the area of the cylinder inner peripheral face covered by the piston decreases. As a result, the amount of fuel adhered to the piston top face decreases, while the amount of fuel adhered to the cylinder inner peripheral face increases. Therefore, when changing the fuel injection timing so as to inhibit fuel dilution, it is generally sufficient to change the fuel injection timing so that injection occurs closer to when the piston reaches top dead center. Further, by changing this fuel injection timing it is possible to quite significantly, as well as quickly, change the ratio of the amount of fuel adhered to the piston top face to the amount of fuel adhered to the cylinder inner peripheral face.

Further, the fuel injection mode that is changed may be a fuel injection pressure, for example. Generally, if the fuel injection pressure is lowered, the rate at which the fuel is injected decreases. As a result, the amount of fuel that reaches the cylinder inner peripheral face decreases, resulting in a decrease in the amount of fuel adhered to the cylinder inner peripheral face. Accordingly, by changing the fuel injection pressure as well as the fuel injection timing, it is possible to even more significantly change the ratio of the amount of fuel adhered to the piston top face to the amount of fuel adhered to the cylinder inner peripheral face. As a result, fuel dilution of the lubricating oil can be inhibited even more effectively.

Lowering the fuel injection pressure, however, adversely effects atomization of the injected fuel. Therefore, if the fuel injection pressure is lowered excessively at times such as when the engine temperature (i.e., the cylinder internal temperature) is extremely low, such as during a cold start, there is a possibility that the overall amount of the fuel adhered to the piston top face and the cylinder inner peripheral face will actually increase instead of decrease. Accordingly, it is preferable also to monitor the engine temperature when changing the fuel injection pressure in this way, and set the amount of change of the fuel injection pressure according to that engine temperature or set a restriction on the amount of that change, for example.

Also, when performing a so-called divided injection, whereby the fuel injection is divided into a plurality of stages instead of just one, a division ratio of these fuel injection quantities may also be controlled as one of the fuel injection modes. In this case, the fuel dilution of the lubricating oil can be inhibited by changing the division ratio such that the fuel injection quantity of the fuel injection that is executed closer to when the piston reaches top dead center is relatively large, and the fuel injection quantity of the fuel injection that is executed closer to when the piston reaches bottom dead center is relatively small.

In addition, it is also possible to inhibit fuel dilution by changing the fuel injection quantity, such as by decreasing an increase amount value when increasing the fuel injection quantity, for example.

Furthermore, in the fuel injection control apparatus for an in-cylinder injection internal combustion engine, the dilution degree estimating portion may estimate the degree of fuel dilution based on an operating history of the internal combustion engine. With this construction, the degree of fuel dilution of the overall lubricating oil changes according to the operating state of the internal combustion engine.

For example, if a so-called cold short trip, in which the internal combustion engine is started when the engine temperature is low and is then stopped before the engine temperature has risen sufficiently, is repeated, the degree of fuel dilution increases greatly. On the other hand, if internal combustion the engine is operated for an extended period of time after it has finished warming up, fuel contained in the lubricating oil gradually evaporates during that time such that the degree of fuel dilution decreases. Therefore, the degree of fuel dilution of the overall lubricating oil can be estimated by referring to the operating history of the internal combustion engine.

Moreover, the dilution degree estimating portion may monitor whether the internal combustion engine was operating in a state in which the degree of fuel dilution increases, and estimate the degree of fuel dilution based on that monitored history. According to this construction, the degree of fuel dilution of the overall lubricating oil can accurately be estimated when it increases.

Here, when the engine temperature at engine startup is high, for example, the degree of fuel dilution of the overall lubricating oil does not increase because fuel does not adhere to the piston top face or the cylinder inner peripheral face in the first place. Therefore, it is possible to monitor the engine temperature at engine startup and determine that the engine was operating in a state in which the degree of fuel dilution increases when the engine temperature at engine startup is equal to, or less than, a predetermined temperature, for example.

Even if the engine temperature at engine startup is low, however, if the internal combustion engine continues to operate for an extended period of time thereafter, the cylinder internal temperature rises, thus inhibiting the adhesion of fuel to the piston top face and the cylinder inner peripheral face. Further, the lubricating oil temperature gradually rises from the combustion heat generated in the cylinder, so more fuel evaporates from the lubricating oil.

Accordingly, if the time from startup until stop of the internal combustion engine is sufficiently long, even if the degree of fuel dilution temporarily increases when the engine is initially operated, that degree of fuel dilution gradually decreases thereafter due to the fuel evaporating from the lubricating oil during operation of the engine. Then, either the increase in the degree of fuel dilution that occurred when the engine was initially operated is cancelled out by this decrease in the degree of fuel dilution, or, if the increase has been exceeded, there is no longer a need to retain the history which indicates that the internal combustion engine was operating in a state in which the degree of fuel dilution increased.

Accordingly, for example, the engine operating time from after engine startup until engine stop may be measured, and it can also be determined that the internal combustion engine was operating in a state in which the degree of fuel dilution increases, when, and the engine temperature at engine startup is equal to, or less than, a predetermined temperature and the engine operating time is equal to, or less than, a predetermined value.

Also, when the time from startup to stop of the internal combustion engine is the same, the cylinder internal temperature rises more quickly when a large quantity of fuel, as opposed to a small quantity of fuel, is supplied to engine combustion during that time. Therefore, adhesion of fuel to the piston top face and the cylinder inner peripheral face is inhibited at an earlier stage, and evaporation of the fuel from the lubricating oil due to the rise in temperature of the lubricating oil is also promoted to an even greater extent. There is a correlation between the rate of increase in both the cylinder internal temperature and the lubricating oil temperature, and the total amount of combustion heat generated within the cylinder after engine startup. Therefore, to accurately determine whether the internal combustion engine was operating in a state in which the degree of fuel dilution increases, it is considered preferable to monitor the total amount of combustion heat generated within the cylinder from engine startup until engine stop.

The dilution degree estimating portion may also estimate the total amount of combustion heat generated within the cylinder from engine startup until engine stop based on the engine operating state, and determines that the internal combustion engine was operating in a state in which the degree of fuel dilution increases when the engine temperature at engine startup is equal to, or less than, a predetermined temperature and the estimated total amount of combustion heat is equal to, or less than, a predetermined amount.

With this construction, it is possible to accurately determined that the internal combustion engine was operating in a state in which the degree of fuel dilution of the overall lubricating oil increases, and estimate when the degree of fuel dilution of the overall lubricating oil is high with even greater accuracy based on that determination. It is preferable that, for the engine temperature, the cylinder internal temperature, for example, be directly detected. Alternatively, however, the engine temperature can also be estimated based on, for example, an engine coolant temperature at engine startup, an intake air temperature, an ambient air temperature, or a combination of one or more of these.

Also, it is determined that the internal combustion engine was operating in a state in which the degree of fuel dilution increases when the engine temperature at engine startup is equal to, or less than, a predetermined temperature and the total amount of combustion heat is equal to, or less than, a predetermined amount. Alternatively, however, the predetermined amount to be compared to the total amount of combustion heat may also be variably set according to the engine temperature at engine startup. That is, even if the engine temperature at engine startup is equal to, or less than, the predetermined temperature, when that engine temperature is relatively high, the amount of increase in the degree of fuel dilution that occurs during initial engine operation is small so the total amount of combustion heat necessary to cancel out or exceed that amount of increase in the degree of fuel dilution is naturally less. Therefore, a construction in which the predetermined amount to be compared with the total amount of combustion heat is set smaller the higher the engine temperature at engine startup, is extremely effective in accurately determining whether the internal combustion engine was operating in a state in which the degree of fuel dilution increases.

In addition, it can be determined whether the total amount of combustion heat generated within the cylinder from engine startup until engine stop is equal to, or less than, a predetermined amount based on, for example, whether an intake air quantity sum value or a fuel injection quantity sum value, from engine startup until engine stop, is equal to, or less than, a predetermined value. The combustion heat generated within the cylinder from each fuel injection changes depending on not only the intake air quantity and the fuel injection quantity, but also the air-fuel ratio at the time of fuel injection and the ignition timing and the like. Therefore, in order to accurately estimate the amount of combustion heat, it is also effective to use a method such as placing emphasis on the intake air quantity and fuel injection quantity during those changes in the combustion heat according to the air-fuel ratio and ignition timing, and adding them up and the like.

Furthermore, the dilution degree estimating portion may determine whether the degree of fuel dilution is decreasing based on a temperature of the lubricating oil or a parameter that correlates with that temperature, and estimate the degree of fuel dilution based on the size of a counter value which is counted up when a history of operation of the internal combustion engine in a state in which the degree of fuel dilution increases has been generated, and which is gradually counted down when it has been determined that the degree of fuel dilution is decreasing. In addition, the control portion of the fuel injection control apparatus for an in-cylinder injection internal combustion engine may execute control according to the fuel injection mode based on the size of the counter value.

As described above, if operation of the internal combustion engine in a state in which the degree of fuel dilution increases, e.g., a cold short trip or the like, is repeated frequently, it will lead to a gradual increase in the degree of fuel dilution of the overall lubricating oil. On the other hand, if the internal combustion engine is operated for an extended period of time such that the lubricating oil temperature rises, the amount of fuel contained in the lubricating oil that evaporates also increases, resulting in a gradual decrease over time in the degree of fuel dilution of the overall lubricating oil.

Accordingly, by setting the counter value that changes according to an increase or decrease in the degree of fuel dilution, the degree of fuel dilution can be estimated with even greater accuracy based on the size of the counter value.

Furthermore, the dilution degree estimating portion may estimate the degree of fuel dilution by first calculating a rate of increase in the degree of fuel dilution based on a parameter that correlates with the amount of fuel adhering to the cylinder inner peripheral face from the fuel injection, then sequentially updating the degree of fuel dilution based on the calculated rate of increase and learning this updated degree of fuel dilution.

The degree of fuel dilution of the overall lubricating oil gradually progresses when the lubricating oil adhered to the cylinder inner peripheral face is diluted by fuel adhered to that inner peripheral face from a fuel injection, and this diluted lubricating oil mixes with the rest of the lubricating oil. Therefore, the degree of progression of the fuel dilution, i.e., the rate of increase in the degree of fuel dilution, can be calculated based on the amount of fuel adhered to the cylinder inner peripheral face from a fuel injection (or more accurately, a parameter that correlates with that amount of fuel).

Therefore, it is possible to accurately estimate the degree of fuel dilution together with the increase in the degree of fuel dilution by sequentially updating the value of the current degree of fuel dilution based on the calculated rate of increase and learning the updated value of the degree of fuel dilution as the value of the new degree of fuel dilution.

Also, it is difficult to directly detect the amount of fuel adhered to the cylinder inner peripheral face, but it can easily be obtained based on a parameter that correlates with the amount of this adhered fuel, such as the fuel injection quantity, the fuel injection timing, or the engine temperature, or a combination of two or more these parameters. The correlation between the amount of fuel adhered to the cylinder inner peripheral face and these parameters is as follows. The amount of fuel adhered to the cylinder inner peripheral face tends to increase (i) as the fuel injection quantity increases, (ii) as the fuel injection timing is set closer to when the piston reaches bottom dead center, and (iii) as the engine temperature decreases. Therefore, each of these tendencies are taken into consideration when obtaining the amount of fuel adhered to the cylinder inner peripheral face.

Further, the dilution degree estimating portion may estimate the degree of fuel dilution by further estimating an amount of fuel evaporated from the overall lubricating oil based on the temperature of the lubricating oil or a parameter that correlates with that temperature, calculating a rate of decrease of the degree of fuel dilution based on the estimated fuel evaporation amount, sequentially updating the degree of fuel dilution based on the calculated rate of decrease and calculated rate of increase, and learning the updated degree of fuel dilution.

The degree of fuel dilution of the overall lubricating oil is gradually reduced as the temperature of the lubricating oil increases from engine combustion heat and the like and the fuel contained within the lubricating oil evaporates. Therefore, the degree by which the fuel dilution is reduced, i.e., the rate of decrease in the degree of fuel dilution, can be calculated based on the temperature of the lubricating oil or a parameter that correlates with that temperature.

Accordingly, the degree of fuel dilution, together with both the increase and decrease in that degree of fuel dilution, can be estimated with even greater accuracy by sequentially updating the value of the current degree of fuel dilution based on not only the rate of increase, but also the rate of decrease, of the degree of fuel dilution, and learning this updated value of the degree of fuel dilution as the value of the new degree of fuel dilution.

The temperature of the lubricating oil may also be detected directly using an oil sensor or the like, or obtained based on a parameter that correlates with the engine coolant temperature or lubricating oil temperature or the like. In addition, the initial value of this lubricating oil temperature may be estimated based on the engine temperature (e.g., engine coolant temperature) at engine startup, and the amount of increase in the engine temperature may be estimated based on the total amount of combustion heat after engine startup (i.e., it may be obtained by the intake air quantity sum value or the fuel injection quantity sum value, for example). The current lubricating oil temperature may then be obtained based on the initial value and the amount of increase.

DETAILED DESCRIPTION OF THE PREFERRED EMBODIMENTS

Hereinafter, a first exemplary embodiment according to the invention will be described.

Figure 1:
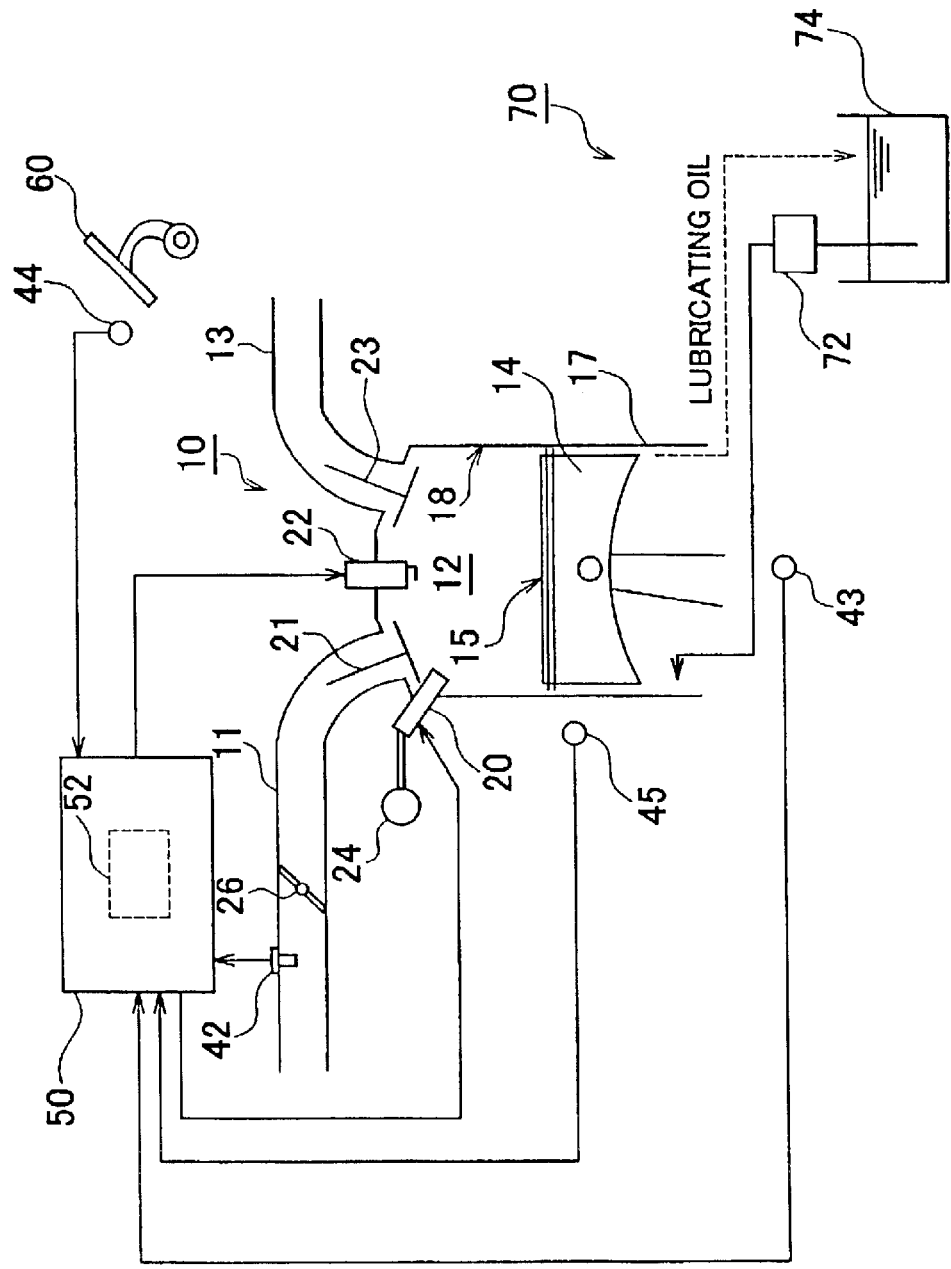
FIG. 1 is a schematic diagram of a fuel injection control apparatus and an internal combustion engine to which this fuel injection control apparatus has been applied.

FIG. 1 is a schematic diagram of a fuel injection control apparatus according to this exemplary embodiment, showing an internal combustion engine 10 to which this fuel injection control apparatus has been applied, and a lubrication system 70 that supplies lubricating oil to the internal combustion engine 10.

As shown in FIG. 1, the internal combustion engine 10 is an in-cylinder injection type internal combustion engine in which fuel is injected directly into a combustion chamber 12 of each cylinder 17 from a fuel injection valve 20. An engine piston (hereinafter simply referred to as "piston") 14 is provided within each cylinder 17 so as to be able to move in a reciprocating motion. The combustion chamber 12 is defined by a piston top face 15 of this piston 14, and a cylinder inner peripheral face 18.

An intake passage 11 and an exhaust passage 13 are both connected to this combustion chamber 12. Midway in the intake passage 11 is provided a throttle valve 26, which regulates the amount of intake air introduced into the combustion chamber 12. The intake air let into the combustion chamber 12 when an intake valve 21 is open mixes with the fuel injected from the fuel injection valve 20 to become an air-fuel mixture. This air-fuel mixture is ignited by a spark from a spark plug 22 and burned, after which it is exhausted from the combustion chamber 12 through an exhaust passage 13 when an exhaust valve 23 is opened.

Further, the fuel injection valve 20 is connected to a delivery pipe 24 which supplies fuel to the fuel injection valve 20 via a fuel pump, not shown, at a predetermined pressure. The fuel pressure within the delivery pipe 24, i.e., the fuel injection pressure at the fuel injection valve 20, is able to be adjusted by appropriately changing the amount of fuel discharged from the fuel pump.

Further, the lubrication system 70 of the internal combustion engine 10 includes an oil pan 74 formed as part of a crankcase, not shown, and a lubricating oil supply apparatus 72. This lubricating oil supply apparatus 72 includes an oil pump, a filter, an oil jet mechanism and the like, none of which are shown. The lubricating oil in the oil pan 74 is drawn up by the oil pump through the filter and supplied to the oil jet mechanism. The lubricating oil supplied to the oil jet mechanism is then supplied from the oil jet mechanism to the cylinder inner peripheral face 18 to provide lubrication between the piston 14 and the cylinder inner peripheral face 18. As the piston 14 reciprocates, the lubricating oil is scraped down the cylinder inner peripheral face 18 after which it eventually returns to the oil pan 74. The lubricating oil that has been scraped off then mixes with the lubricating oil in the oil pan 74, after which it is once again used to lubricate the internal combustion engine 10. It should be noted that the lubricating oil supplied to the cylinder inner peripheral face 18 to provide lubrication for the piston 14 returns to the oil pan 74 with an increased temperature due to engine combustion heat. Therefore, when the lubricating oil starts to circulate via the lubrication system 70 following engine startup, the average temperature of the overall lubricating oil increases gradually until the lubricating oil reaches a state of thermal equilibrium.

The combustion mode of the internal combustion engine 10 is controlled according to the engine load. For example, when the engine is operating under a high load, the combustion mode is set to homogeneous combustion. During homogeneous combustion, the fuel injection quantity and the like is controlled such that the air-fuel ratio A/F is, for example, near the stoichiometric air-fuel ratio (e.g., A/F=12 to 15), and the fuel injection timing is set to during the intake stroke (i.e., intake stroke injection).

When the engine is operating under a low load, on the other hand, the combustion mode is set to stratified combustion. During stratified combustion, the fuel injection quantity and the like is controlled such that the air-fuel ratio A/F is leaner than the stoichiometric air-fuel ratio (e.g., A/F=17 to 40), and the fuel injection timing is set to late in the compression stroke (i.e., compression stroke injection).

Further, when the engine is operating under a medium-sized load, the combustion mode is set to semi-stratified combustion for smooth switching of the combustion mode between stratified combustion and homogeneous combustion while inhibiting fluctuation in the engine output, and the like. In semi-stratified combustion, combustion is performed with a lower degree of stratification than stratified combustion. During semi-stratified combustion, the fuel injection quantity and the like is controlled such that the air-fuel ratio A/F is leaner than the stoichiometric air-fuel ratio (e.g., A/F=15 to 25), and fuel injection is performed at both the intake stroke and the compression stroke (i.e., two stage injection).

When the engine is cold (e.g., during a period when an engine coolant temperature THW is equal to, or less than, a predetermined temperature THWL), the injected fuel tends not to atomize as easily. Therefore, when the engine is cold, the combustion mode is set to homogeneous combustion and the intake stroke injection is executed, regardless of the engine load. As a result, the period from fuel injection until ignition is able to be lengthened compared to during stratified combustion in which the compression stroke injection is executed, thus promoting atomization of the injected fuel to the fullest.

The control over this combustion mode is performed by an electronic control unit 50. This electronic control unit 50, which comprehensively executes various controls in the internal combustion engine 10, such as air-fuel ratio control and fuel injection control, is provided with a calculating unit, a drive circuit and the like, as well as a memory 52 that stores calculation results from the various controls and function maps used in those calculations, and the like.

Further, various sensors are also provided in the internal combustion engine 10 to detect the engine operating state. For example, an intake air quantity sensor 42 that detects the intake air quantity is provided on the upstream side of the throttle valve 26 in the intake passage 11; a rotational speed sensor 43 that detects a rotational speed of an output shaft, not shown, of the internal combustion engine 10 (i.e., the engine speed) is provided near that output shaft; an accelerator sensor 44 that detects a depression amount (i.e., accelerator opening) of an accelerator pedal 60 is provided near that accelerator pedal 60; and a coolant temperature sensor 45 that detects a temperature of engine coolant is mounted on a cylinder block, not shown. The detection results of these sensors 42 through 45 are all read by the electronic control unit 50, which then executes various controls according to the operating state of the engine based on these detection results.

Next, a fuel injection control, which is one of those various controls, and which controls fuel injection mode of the fuel injection valve 20, such as the fuel injection timing, will be described. When the engine is cold, some of the fuel injected into the combustion chamber 12 from the fuel injection valve 20 adheres to the piston 14 and the cylinder inner peripheral face 18, which has adverse effects on the internal combustion engine 10, such as deterioration of the exhaust gas emissions and fuel dilution described above.

Thus, with the fuel injection control according to this exemplary embodiment, by suitably controlling the fuel injection timing of the intake stroke injection, the fuel dilution and deterioration in exhaust gas emissions due to fuel adhering to the cylinder inner peripheral face and the piston top face are able to be dealt with flexibly according to the actual degree of the adverse effect that they have on the internal combustion engine 10.

More specifically, a history of the internal combustion engine 10 operating under a condition when the degree of fuel dilution increases, more specifically, a history of when there was a cold short trip, is first monitored (operation history monitoring routine). Then, when it is determined based on the monitoring results that the degree of fuel dilution has increased to the point where the adverse effect it has can no longer be ignored, the fuel injection timing is changed to a timing to inhibit fuel dilution, which differs from the fuel injection timing during normal operation (fuel injection timing calculating routine).

Figure 2:
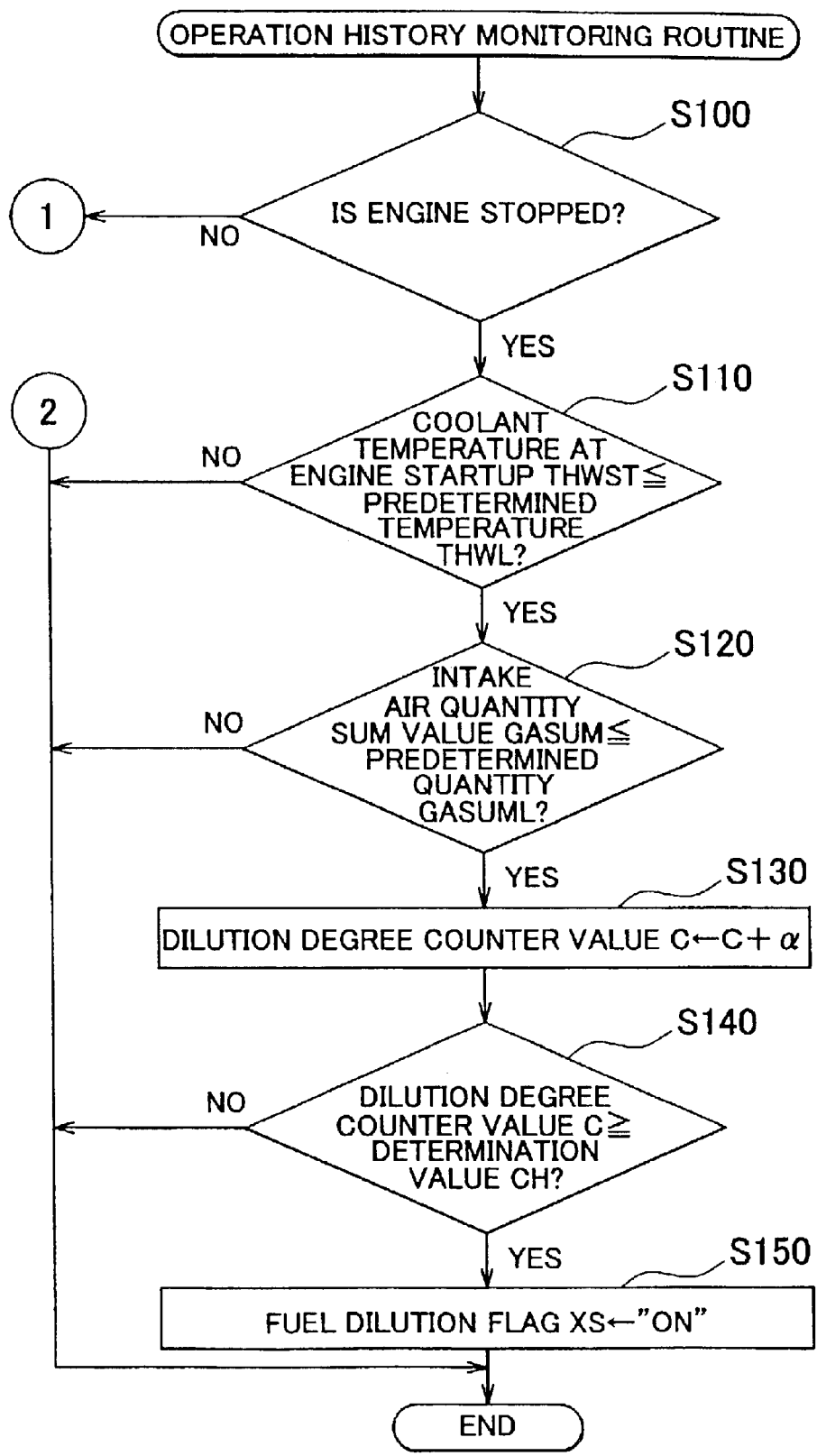
FIG. 2 is a flowchart illustrating processes of an operation monitoring routine.
Figure 3:
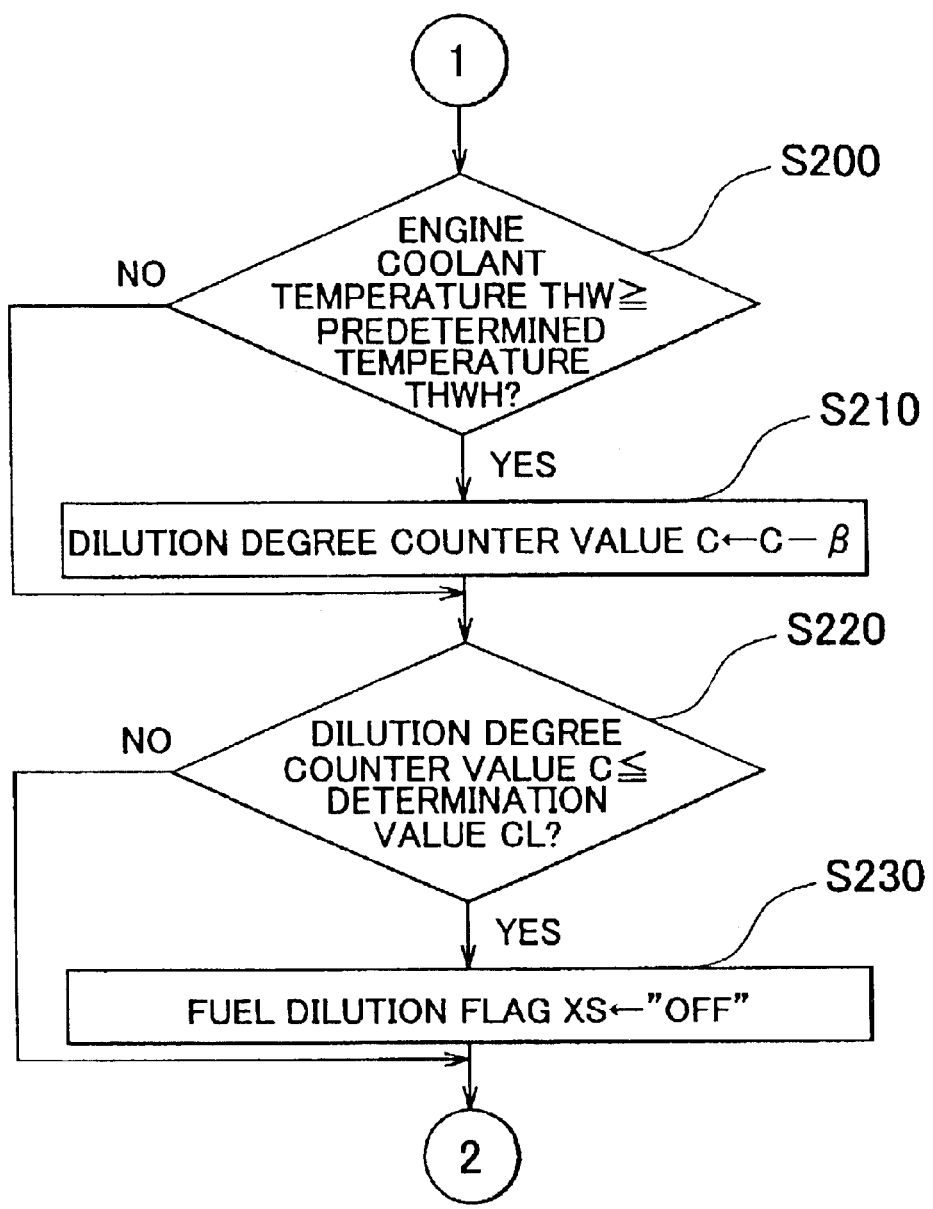
FIG. 3 is a flowchart illustrating processes of the operation monitoring routine.
Figure 4:
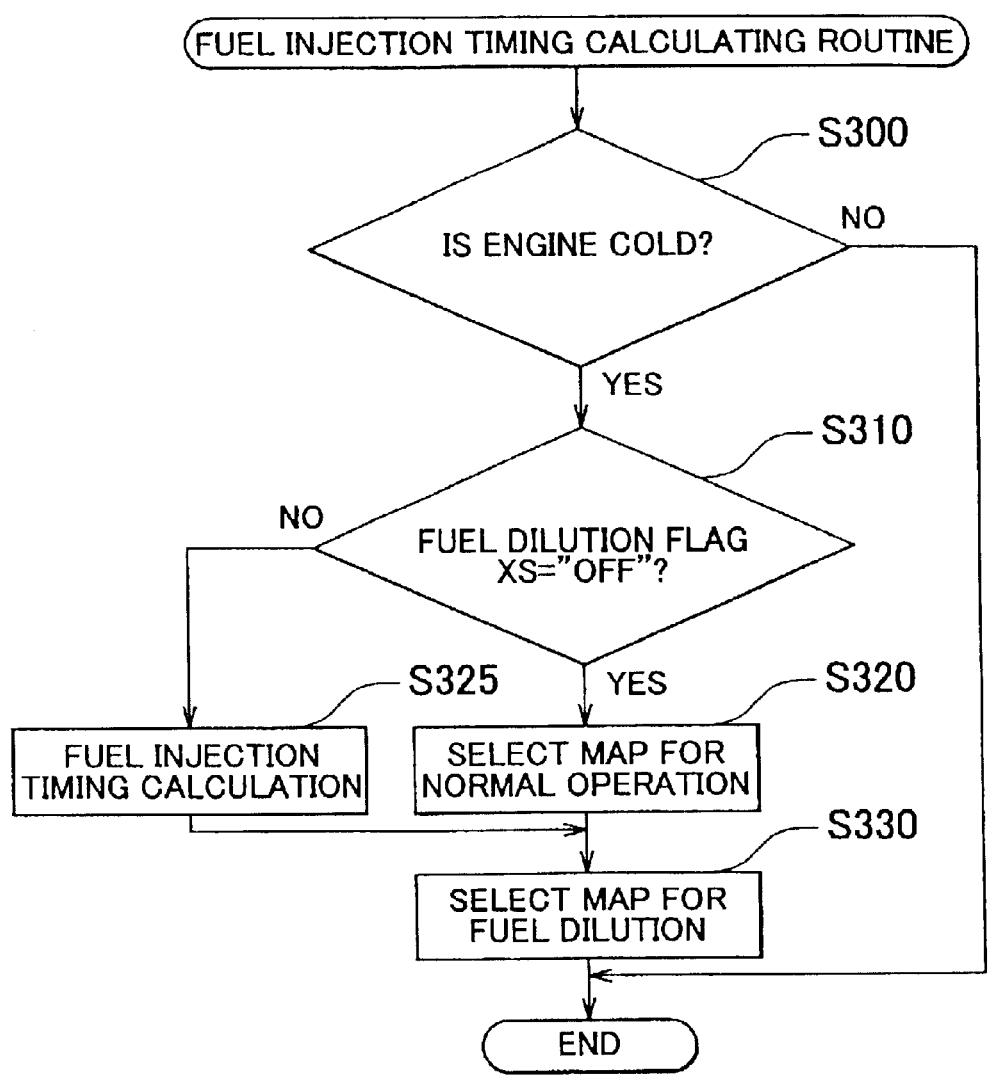
FIG. 4 is flowchart illustrating processes of a fuel injection timing calculating routine.
Figure 5:
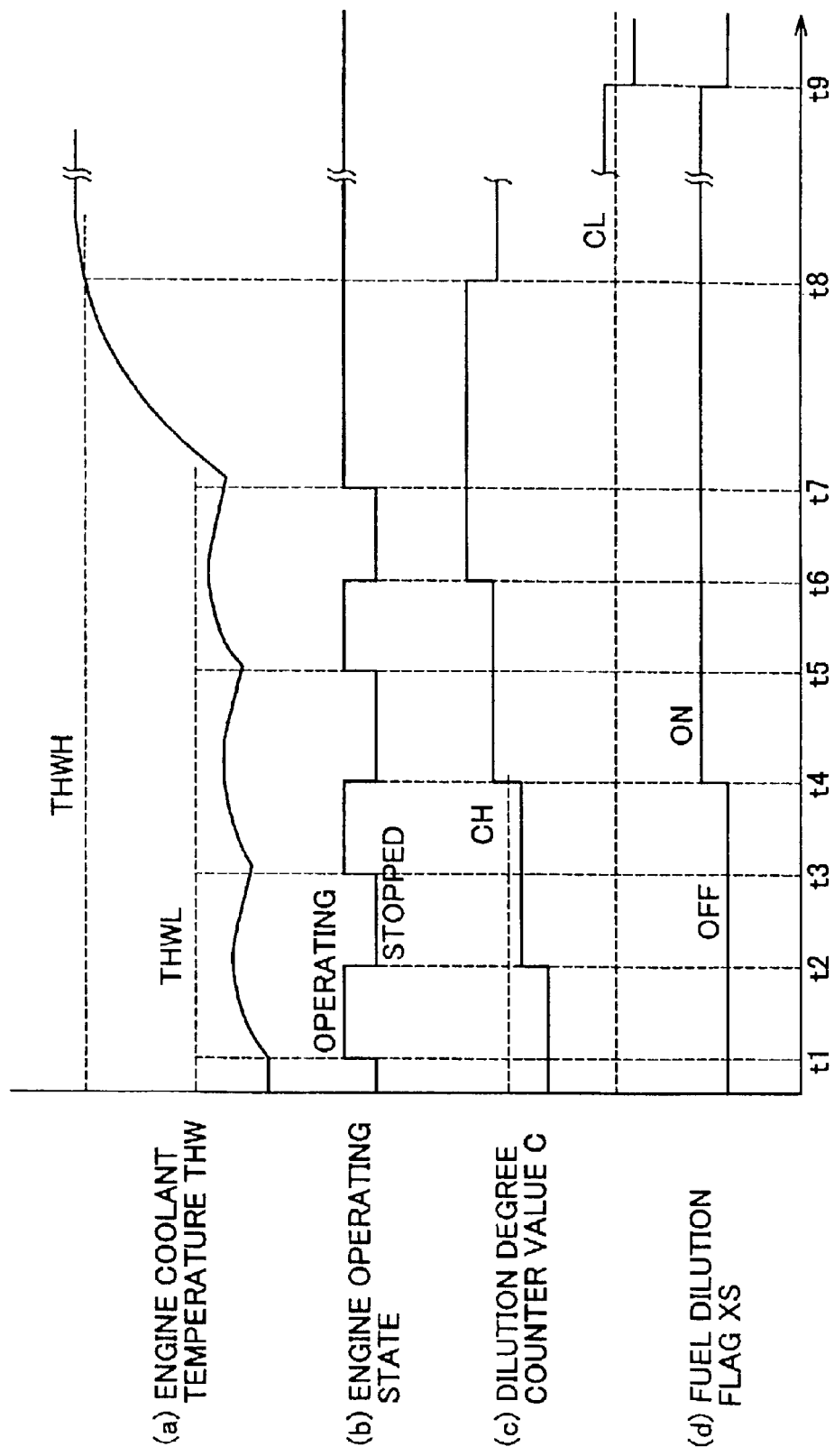
FIG. 5 is flowchart illustrating an operation mode and the like of a fuel dilution flag.

The flowcharts in FIG. 2 and FIG. 3 each show the processes in the operating history monitoring routine. The flowchart in FIG. 4 shows the processes in the fuel injection timing calculating routine. The electronic control unit 50 executes the series of processes shown in each figure repeatedly at a predetermined time cycle T. The timing chart in FIG. 5 shows an example of the control modes based on each of the processes.

Hereinafter, a fuel injection control of an apparatus according to the exemplary embodiment will be described in detail with reference to FIGS. 2 through 5. First the operation history monitoring routine will be described. In this routine, it is first determined whether the internal combustion engine 10 is stopped (step S100 in FIG. 2). Power is continuously supplied to the electronic control unit 50, even after operation of the internal combustion engine 10 has stopped, until a predetermined period of time has passed so that the electronic control unit 50 is able to perform this operation. The electronic control unit 50 executes post-processing, such as storing in the memory 52 the execution results of the various controls that are executed while the engine is operating until a predetermined period of time has passed after the engine is stopped. The information stored by this post-processing becomes necessary when the engine is operated the next time.

Then, when it is determined that the engine is stopped (YES in step S100; timings t2, t4, and t6 in FIG. 5), the value of the engine coolant temperature THW at engine startup (hereinafter, referred to as "coolant temperature at engine startup THWST") is then read from the memory 52. It is then determined whether this is equal to, or less than, a predetermined temperature THWL (step S110). Here, it is determined whether combustion has ended without any of the injected fuel remaining adhered to the piston top face 15 and the cylinder inner peripheral face 18, i.e., whether the engine was started in a state in which there is a fear of deteriorating exhaust gas emissions and fuel dilution as described above.

Here, when it is determined that the coolant temperature at engine startup THWST is equal to, or less than, the predetermined temperature THWL (i.e., YES in step S110), i.e., when the engine started this time in a state in which there is a fear of deteriorating exhaust gas emissions or fuel dilution (timings t1, t3, t5, and t7 in FIG. 5), it is further determined whether an intake air quantity sum value after engine startup GASUM is equal to, or less than, a predetermined quantity GASUML (step S120).

Even when the coolant temperature at engine startup THWST is low, if the internal combustion engine 10 is continuously operated for an extended period of time thereafter, the temperature in the combustion chamber 12 rises, thus promoting atomization of the injected fuel and inhibiting fuel adhesion to the piston top face 15 and the cylinder inner peripheral face 18. Further, the temperature of the lubricating oil rises gradually from the engine combustion heat. As the temperature of the lubricating oil rises, the amount of fuel that evaporates from the lubricating oil increases.

Therefore, even if the coolant temperature at engine startup THWST is low and the degree of fuel dilution temporarily increases when the engine is initially operated, the degree of fuel dilution gradually decreases thereafter due to the fuel evaporating from the lubricating oil during operation of the engine. Then, either the increase in the degree of fuel dilution that occurred when the engine was initially operated is cancelled out by this decrease in the degree of fuel dilution, or the increase is exceeded so there is no longer a need to retain the history which indicates that the internal combustion engine 10 was operating in a state in which the degree of fuel dilution increases, i.e., the history which indicates that there was a cold short trip.

Also, the amount of combustion heat generated by combustion each time correlates with the intake air quantity at that time and the fuel injection quantity set based on that intake air quantity in such a way that the amount of combustion heat tends to increase the greater that intake air quantity and fuel injection quantity. Therefore, the amount of combustion heat generated while the engine is operating may be considered to correlate with the intake air quantity sum value after engine startup GASUM of this intake air quantity.

Therefore, by setting the predetermined quantity GASUML appropriately in step S120, it can be appropriately determined whether the temperature of the lubricating oil has increased while the engine is operating such that enough of the fuel has evaporated that either the increase in the degree of fuel dilution generated during initial operation of the engine is cancelled out by the decrease in the degree of the fuel dilution by this evaporation of fuel, or the increase has been exceeded.

The determination in step S120 is always negative after the point at which execution of stratified combustion is allowed following a rise in the engine coolant temperature. That is, in step S120, the combustion mode is set to homogeneous combustion when the engine is cold, and an intake air quantity sum value during the period the intake stroke injection is executed becomes a substantial comparative referent against the predetermined quantity GASUML.

When it is determined in step S120 that the intake air quantity sum value after engine startup GASUM is equal to, or less than, the predetermined quantity GASUML (i.e., YES in step S120), it is determined that the current engine operation corresponds to a cold short trip. In this case, a dilution degree counter value C is counted up by a predetermined amount α (step S130; timings t2, t4, and t6 in FIG. 5). This dilution degree counter value C is indicative of the degree of progression of the dilution by fuel of the overall lubricating oil. The dilution degree counter value C is operated via the series of processes so as to become larger as the degree of fuel dilution increases and smaller as the degree of fuel dilution decreases. The count up process of step S130 is executed only once after the engine has been stopped, on the condition that it has not yet been executed after a determination of engine stop has been made.

When the dilution degree counter value C is counted up in this way, it is then determined whether the dilution degree counter value C is equal to, or greater than, a determination value CH (step S140). Here, when the dilution degree counter value C is equal to, or greater than, the determination value CH (i.e., YES in step S140), it is determined that the degree of fuel dilution of the overall lubricating oil has increased to the point where, if fuel dilution progresses, the resultant adverse effects, such as a decline in lubrication performance, will not be able to be ignored any longer. Then, based on that determination, the fuel dilution flag XS is set to "ON" (step S150; timing t4 in FIG. 5). In a fuel injection timing calculation routine, to be described later, the fuel dilution flag XS must be set to "ON" for the fuel injection timing change, described above, to be executed. After the fuel dilution flag XS is set to "ON", the routine ends.

On the other hand, when it is determined in step S100 that the internal combustion engine 10 is operating (i.e., NO in step S100), it is then determined whether the engine coolant temperature THW is equal to, or greater than, the predetermined temperature THWH (step S200 in FIG. 3).

Here, it is determined whether the average temperature of the overall lubricating oil has risen to equal to, or greater than, the predetermined temperature by comparing the engine coolant temperature THW with the predetermined temperature THWH, and finally, whether the amount fuel evaporated from the overall lubricating oil following that rise in temperature has increased to a predetermined quantity so that the degree of fuel dilution is decreasing. That is, if the engine coolant temperature THW is rising, then the combustion heat amount generated after engine startup can be considered to be large, and it can easily be determined that the fuel evaporation amount has also increased to the point where it reduces the degree of fuel dilution.

Here, when it is determined that the engine coolant temperature THW is equal to, or greater than, the predetermined temperature THWH, i.e., when it is determined that the fuel evaporation amount following the rise in temperature of the overall lubricating oil has increased to equal to, or greater than, a predetermined amount (i.e., YES in step S200), the dilution degree counter value C is counted down by a predetermined amount β (step S210; timings t8 and t9 in FIG. 5). The count down process in step S210 is executed on the condition that a predetermined period of time has passed from the last time the process was executed. That is, the dilution degree counter value C is counted down each time a predetermined period of time passes after the engine coolant temperature THW has become equal to, or greater than, the predetermined temperature THWH.

On the other hand, when it is determined that the engine coolant temperature THW is less than the predetermined temperature THWH (i.e., NO in step S200), the count down process is not executed. Next, it is determined whether the dilution degree counter value C is equal to, or less than, a determination value CL (step S220). Here, when the dilution degree counter value C is equal to, or less than, the determination value CL (i.e., YES in step S220), the degree of fuel dilution of the overall lubricating oil is small so it is determined that the adverse effect on the internal combustion engine 10 is at a level that can effectively be ignored, even if the degree of fuel dilution of the overall lubricating oil progresses due to fuel dilution temporarily occurring from a fuel injection. The fuel dilution flag XS is then set to "OFF" based on this determination (step S230; timing t9 in FIG. 5). Then, after the fuel dilution flag XS is turned OFF, the routine ends.

The determination value CL in the determination process in step S220 is set to a value smaller than the determination value CH in the determination process in step S140. That is, because the determination value CL and the determination value CH are made different values, so-called hysteresis is made a condition for turning the fuel dilution flag XS ON and OFF. Therefore, it is possible to prevent the fuel injection control from becoming unstable, which is feared when hysteresis is not set, e.g., when the fuel dilution flag XS is turned ON and OFF excessively and the fuel injection timing is changed frequently during a short period of time regardless of the fact that there is no change in the engine operating state.

On the other hand, when the dilution degree counter value C is equal to, or greater than, the determination value CL, (i.e., NO in step S220), the routine ends without the fuel dilution flag XS being turned OFF.

In contrast, when it is determined in steps S110 and S120 in FIG. 2 that the coolant temperature at engine startup THWST is greater than the predetermined temperature THWL (i.e., NO in step S110) and the intake air quantity sum value after engine startup GASUM is greater than the predetermined quantity GASUML (NO in step S120), it is determined that the current engine operation does not correspond to a cold short trip. In this case, the routine ends without the count up process of the dilution degree counter value C being performed.

Further, when it is determined in step S140 that the dilution degree counter value C is less than the determination value CH (i.e., NO in step S140), it is determined that the adverse effect of the degree of fuel dilution has not yet reached the point where is can no longer be ignored, even though the dilution degree counter value C has counted up because the current engine operation corresponds to a cold short trip. In this case, the routine ends without the fuel dilution flag XS being turned ON.

Next, the fuel injection timing calculating routine will be described. In this routine, it is first determined whether the engine is cold (step S300 in FIG. 4). More specifically, it is determined whether the engine is in a state in which fuel dilution and deterioration of the exhaust gas emissions due to fuel adhering to the piston top face 15 and the cylinder inner peripheral face 18 can occur, by comparing the engine coolant temperature THW with the predetermined temperature THWL.

Here, when it is determined that the engine coolant temperature THW is greater than the predetermined temperature THWL, and therefore that deterioration of the exhaust gas emissions due to fuel adhesion will not occur (i.e., NO in step S300), the routine ends. That is, in this case, as described above, the combustion mode of the internal combustion engine 10 is set based on the engine load and fuel injection timing control corresponding to that set combustion mode is executed in a process or processes other than this process.

When it is determined that the engine coolant temperature THW is equal to, or less than, than the predetermined temperature THWL, and therefore that deterioration of the exhaust gas emissions due to fuel adhesion may occur (i.e., YES in step S300), the combustion mode is set uniformly to homogeneous combustion, regardless of the engine load, such that the intake stroke injection is performed. Then the fuel injection timing corresponding to this intake stroke injection is calculated in the processes thereafter (i.e., steps S310, S325, and S330).

During this calculation, it is first determined whether the fuel dilution flag XS is set to "OFF" (step S310). Here, when the fuel dilution flag XS is set to "OFF" (i.e., YES in step S310), a fuel injection timing calculation map for normal operation is selected (step S320) because the fuel dilution of the overall lubricating oil has not progressed very much so the resultant adverse effects on the internal combustion engine 10 are at a level where they can effectively be ignored.

When the fuel dilution flag XS is set to "ON", on the other hand (NO in step S310), a fuel injection timing calculation map for fuel dilution is selected (step S325) because the fuel dilution of the overall lubricating oil has progressed to the extent where the resultant adverse effects on the internal combustion engine 10 cannot be ignored.

After either the map for fuel dilution or the map for normal operation has been selected in this way, the fuel injection timing is calculated with reference to that map (step S330). Here, the two fuel injection timing calculation maps are both function maps which have the engine load (the fuel injection quantity or the intake air quantity) and the engine speed and the like as parameters, and are set to have the following characteristics. That is, when the parameters of the engine load and the engine speed and the like are compared under the same conditions, the characteristics of the maps are set such that the fuel injection timing calculated based on the map for fuel dilution is always a timing on the advance side with respect to the fuel injection timing calculated based on the map for normal operation.

Therefore, during the period for which the map for fuel dilution is selected (e.g., the periods of timings t1 to t2 and t3 to t4 in FIG. 5), fuel injection is performed when the piston 14 is more toward the top dead center side compared to the period for which the map for normal operation is selected. Accordingly, during fuel injection, the area of the cylinder inner peripheral face 18 that is exposed in the combustion chamber 12 and which is not covered by the piston 14 is small so the amount of fuel adhered to the cylinder inner peripheral face 18 decreases. As a result, fuel dilution caused by fuel adhering to the cylinder inner peripheral face 18 is able to be inhibited, and the progression of the degree of fuel dilution of the overall lubricating oil is also able to be suppressed. Therefore, it is possible to minimize the adverse effects from fuel dilution on the internal combustion engine 10.

On the other hand, during the period for which the map for normal operation is selected (e.g., the period of timing t5 to t6 in FIG. 5), fuel injection is performed when the piston 14 is more toward the bottom dead center side compared to the period for which the map for fuel dilution is selected. Accordingly, during fuel injection, the distance between the injection hole of the fuel injection valve 20 and the piston top face 15 is long so the amount of fuel adhered to the piston top face 15 decreases. As a result, black smoke and an increase in unburned components caused by fuel adhering to the piston top face 15 are able to be kept to the absolute minimum. Therefore, it is possible to suppress adverse effects, such as deterioration of the exhaust gas emissions, on the internal combustion engine 10 to the absolute minimize.

After the fuel injection timing of the intake stroke injection is calculated in this way, the routine ends. The effects of the apparatus according to this exemplary embodiment, which controls the fuel injection timing with the modes described above, are as follows.

(1) When the degree of fuel dilution of the overall lubricating oil is so large that the adverse effects, such as a decline in lubricating oil performance, can no longer be ignored if it progresses any farther, the fuel injection timing of the intake stroke injection is set to a timing farther to the advance side in order to inhibit progression of the fuel dilution. On the other hand, when the degree of fuel dilution of the overall lubricating oil is small such that that the adverse effects therefrom can be ignored, the fuel injection timing of the intake stroke injection is set to a timing farther to the retard side in order to give priority to inhibiting the deterioration of the exhaust gas emissions, and fuel dilution from fuel injection is temporarily allowed. As a result, the fuel injection mode can be flexibly controlled according to the actual degree of the adverse effects on the internal combustion engine 10 from the deterioration of the exhaust gas emissions caused by fuel adhered to the piston top face 15 and the fuel dilution caused by fuel adhering to the cylinder inner peripheral face 18.

(2) In particular, because the fuel injection timing, which is the fuel injection mode here, changes, the ratio of the fuel adhered to the piston top face 15 to the fuel adhered to the cylinder inner peripheral face 18 can be changed relatively drastically and quickly, compared to when the same control is performed with other fuel injection modes, such as the fuel injection pressure, for example. Accordingly, the effect described above can be displayed even more effectively.

(3) Further, the history of the internal combustion engine 10 operating in a state in which the degree of fuel dilution increases, i.e., the history of a cold short trip, is monitored and the results of that monitoring are referenced when operating the dilution degree counter value C. Accordingly, even a degree of fuel dilution of the overall lubricating oil that is generally difficult to detect directly is able to be estimated relatively easily.

(4) Further, it is determined that a cold short trip has occurred when the coolant temperature at engine startup THWST is equal to, or less than, the predetermined temperature THWL and the intake air quantity sum value after engine startup GASUM is equal to, or less than, the predetermined quantity GASUML, when the engine is stopped. Therefore, this determination is able to be made accurately, and the reliability of the history of the internal combustion engine 10 operating in as state in which the degree of fuel dilution increases can be increased.

(5) Also, although the dilution degree counter value C is counted up when a cold short trip has occurred, it is determined whether the degree of fuel dilution is decreasing by comparing the engine coolant temperature THW with the predetermined temperature THWL. When the engine is operating in a state in which the degree of fuel dilution decreases, the dilution degree counter value C is made to count down so that the dilution degree counter value C gradually decreases. Accordingly, regardless of whether the degree of fuel dilution of the overall lubricating oil increases or decreases, it is possible to accurately estimate the degree of fuel dilution based on the dilution degree counter value C. As a result, the fuel injection timing can be switched appropriately based on the dilution degree counter value C.

Next, a second embodiment of the invention will be described. In this second exemplary embodiment, the method for calculating the degree of fuel dilution of the overall lubricating oil is different from that of the first exemplary embodiment.

That is, in this exemplary embodiment, the rate of increase and the rate of decrease in the degree of fuel dilution of the overall lubricating oil are calculated cyclically. The value of the currently estimated degree of fuel dilution is then updated based on the calculated rates of increase and decrease, and the updated value is then learned as the value of the new degree of fuel dilution.

Figure 6:
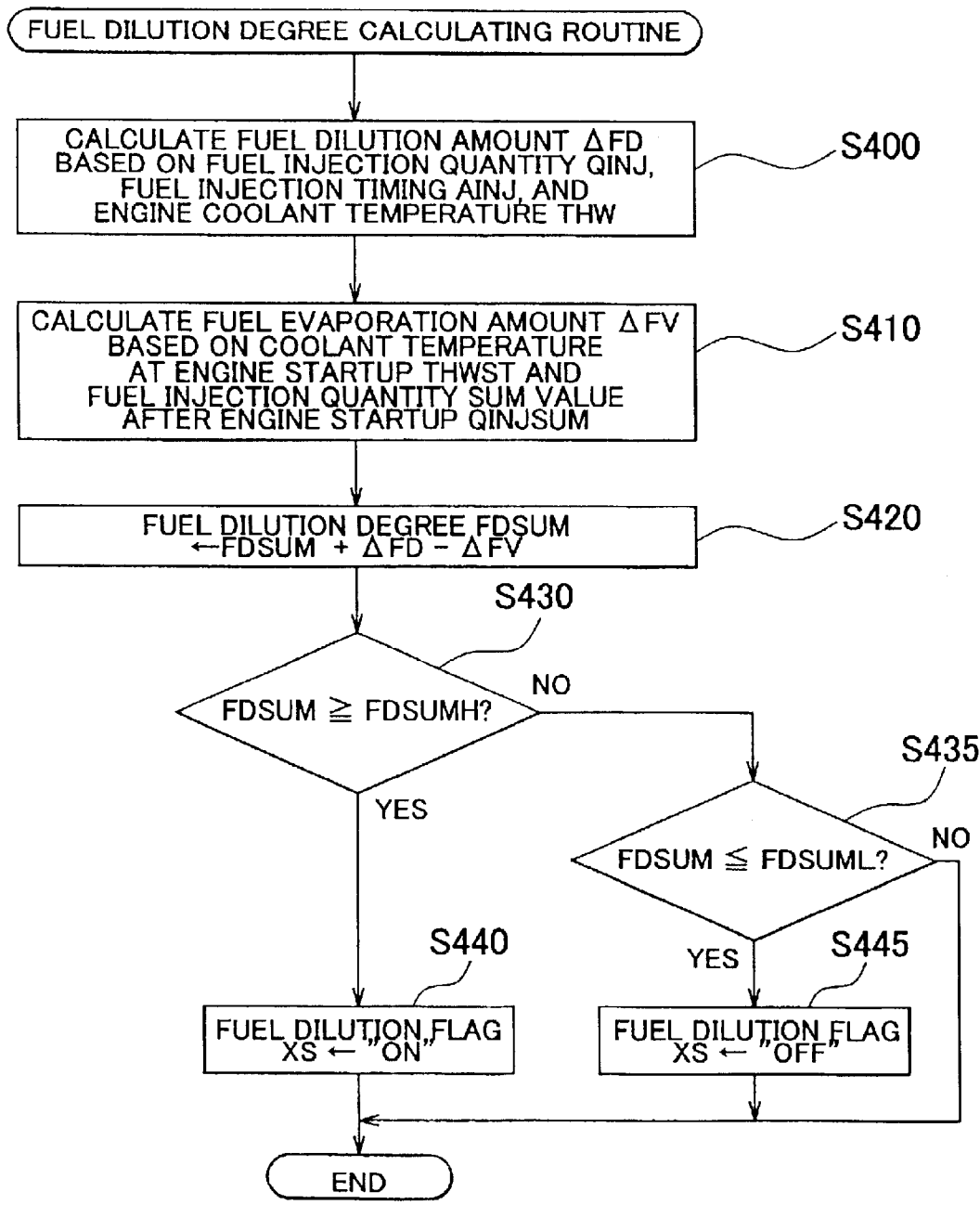
FIG. 6 is flowchart illustrating processes of a fuel dilution degree calculating routine.

The routine for calculating the degree of fuel dilution by the apparatus according to this exemplary embodiment will be described mainly focusing on the differences of the second exemplary embodiment with respect to the first exemplary embodiment regarding. FIG. 6 is a flowchart illustrating processes of a fuel dilution degree calculating routine. The electronic control unit 50 repeatedly executes the routine shown in FIG. 6 at a predetermined time cycle T.

In this routine, a fuel dilution amount ΔFD per unit of time, i.e., the amount of fuel newly mixed with the lubricating oil by fuel injection performed during the time cycle T, is calculated based on operational expression (1) below (step S400). This fuel dilution amount ΔFD corresponds to the rate of increase in the degree of fuel dilution when the fuel evaporated from the overall lubricating oil is not taken into consideration.

$$\Delta FD \leftarrow \Sigma f(QINJi, AINJi, THWi) \quad (1)$$

i=1, 2, 3, ..., n

In this expression, f( ) is a function for obtaining the amount of fuel dilution that occurs from one fuel injection, with a fuel injection quantity QINJ, fuel injection timing AINJ, and engine coolant temperature THW when that fuel injection is executed as the parameters. Also, "i" corresponds to the number of times that the fuel injection has been performed since the last control cycle. For example, when the fuel injection has been performed three times from the last control cycle to the current control cycle, operational expression (1) above can be expressed as expression (2) below.

$$\Delta FD \leftarrow f(QINJ1, AINJ2, THW1) + f(QINJ2, AINJ2, THW2) + f(QINJ3, AINJ2, THW3) \quad (2)$$

The function f( ) is obtained in advance by a test or the like, and is stored in the memory 52 of the electronic control unit 50 as a function map. Also, the basic characteristics of the function f( ) are as follows.

(A) The value of function f( ) increases the larger the fuel injection quantity QINJ; (B) The value of the function f increases the more the fuel injection timing AINJ is retarded; and (C) The value of the function f( ) increases the lower the engine coolant temperature THW. The reason for selecting the fuel injection quantity QINJ, fuel injection timing AINJ, and engine coolant temperature THW as parameters for the function f( ) is as follows.

That is, it is believed that the degree of fuel dilution of the overall lubricating oil greatly increases the larger the amount of fuel adhered to the cylinder inner peripheral face 18 because fuel dilution due to fuel injection occurs when the fuel adhered to the cylinder inner peripheral face 18 remains after combustion. The amount of fuel adhered to the cylinder inner peripheral face 18 is usually difficult to detect directly, but it can be accurately estimated by appropriately selecting a parameter that correlates with it.

The fuel injection quantity QINJ, fuel injection timing AINJ, and engine coolant temperature THW are representative examples of parameters that all correlate with the amount of fuel adhered to the cylinder inner peripheral face 18.

For example, if the fuel injection quantity QINJ is large, the amount of fuel adhered to the cylinder inner peripheral face 18 will obviously increase. Also, when fuel adheres to the cylinder inner peripheral face 18, there is an upper limit value to the amount of fuel able to adhere per unit of area, i.e., there is an upper limit value to the thickness of the fuel layer that can form on the cylinder inner peripheral face 18. Therefore, if the area on which fuel can adhere increases, the thickness of that fuel layer is less likely to reach that upper limit value and more fuel will be able to adhere to the cylinder inner peripheral face 18. The area where fuel can adhere, i.e., the area of the cylinder inner peripheral face 18 that is exposed in the combustion chamber 12 and not covered by the piston 14 during fuel injection, is determined by the fuel injection timing AINJ, and, presuming intake stroke injection, that area of the cylinder inner peripheral face 18 increases the farther the fuel injection timing AINJ is set to the retard side. Accordingly, the amount of fuel adhered to the cylinder inner peripheral face 18 increases as the fuel injection timing AINJ is set to a timing farther on the retard side.

Further, the amount of fuel adhered to the cylinder inner peripheral face 18 and the like is generally remarkable when the atomization of the injected fuel is not promoted and the particle diameter is large. Also, the degree of atomization largely depends on the temperatures of the combustion chamber 12 and the fuel when the fuel injection pressure is constant. Further, the temperatures of the combustion chamber 12 and the fuel correlate with the engine coolant temperature THW such that the lower the engine coolant temperature THW, the less atomization of the fuel is promoted, so the amount of fuel adhered to the cylinder inner peripheral face 18 increases.

Considering these points, in the apparatus according to this exemplary embodiment, the fuel injection quantity QINJ, the fuel injection timing AINJ, and the engine coolant temperature THW are selected as parameters that correlate with the amount of fuel adhered to the cylinder inner peripheral face 18.

When the fuel dilution amount $\Delta FD$ is calculated in this way, the fuel evaporation amount $\Delta FV$ per unit of time, i.e., the amount of fuel that evaporates from the overall lubricating oil during the time cycle T, is then calculated based on operational expression (3) below (step S410). Also, this fuel evaporation amount $\Delta FV$ corresponds to the rate of decrease in the degree of fuel dilution when the fuel dilution due to fuel injection is not taken into consideration.

$$\Delta FV \leftarrow g(THWST, QINJSUM) \quad (3)$$

Here, g( ) is a function for obtaining the fuel evaporation amount $\Delta FV$ per time cycle T, with the coolant temperature at engine startup THWST and the fuel injection quantity sum value after engine startup QINJSUM as its parameters. The coolant temperature at engine startup THWST is used to estimate the initial temperature of the lubricating oil at engine startup. The fuel injection quantity sum value after engine startup QINJSUM is used to estimate the amount of rise in temperature of the lubricating oil thereafter. That is, the function g( ) is basically used to estimate the lubricating oil temperature and convert that estimated result into an amount of evaporated fuel. This function g( ) is obtained in advance by a test or the like, and is stored in the memory 52 of the electronic control unit 50 as a function map. The basic characteristics of the function g( ) are as follows.

(A) The value of function g( ) increases the higher the coolant temperature at engine startup THWST; and (B) The value of the function g( ) increases the larger the fuel injection quantity sum value after engine startup QINJSUM. When the fuel dilution amount $\Delta FD$ and fuel evaporation amount $\Delta FV$ per unit of time are calculated in this way, a fuel dilution degree FDSUM is then calculated based on operational expression (4) below (step S420).

$$FDSUM \leftarrow FDSUM + \Delta FD - \Delta FV \quad (4)$$

As shown in operational expression (4), the current fuel dilution degree FDSUM is updated based on the rate of increase $\Delta FD$ and the rate of decrease $\Delta FV$ in the fuel dilution degree FDSUM. This updated value is then learned as the new fuel dilution degree FDSUM and stored in the memory 52 of the electronic control unit 50.

Next, the fuel dilution degree FDSUM is compared with a determination value FDSUMH (step S430). Here, when the fuel dilution degree FDSUM is equal to, or greater than, the determination value FDSUMH (i.e., YES in step 430), it is then determined that the degree of fuel dilution of the overall lubricating oil has increased to the point where, if fuel dilution progresses any further, the resultant adverse effects, such as a decline in lubrication performance, will not be able to be ignored any longer. Once this determination is made, the fuel dilution flag XS is then set to "ON" (step S440).

On the other hand, when the fuel dilution degree FDSUM is less than the determination value FDSUMH (i.e., NO in step S430), the fuel dilution degree FDSUM is then compared with a determination value FDSUML (<FDSUMH) (step S435). Here, when the fuel dilution degree FDSUM is equal to, or less than, the determination value FDSUML (i.e., YES in step S435), the degree of fuel dilution of the overall lubricating oil is low so it is determined that the resultant adverse effects on the internal combustion engine 10 can effectively be ignored, even if the fuel dilution temporarily occurs due to fuel injection and the degree of fuel dilution progresses. The fuel dilution flag XS is then set to "OFF" based on this determination (step S445).

After either the fuel dilution flag XS has been either turned "ON" in step S440 or turned "OFF" in step S445, or the determination in either of the previous steps S430 or S435 was negative, the routine ends.

The relationship between the determination value FDSUML and the determination value FDSUMH is set as it is (i.e., FDSUML<FDSUMH) for the same reason that the relationship between the determination value CL and the determination value CH is set as it is.

In the previous fuel injection timing calculating routine (see FIG. 4), the fuel injection timing calculation map for the intake stroke injection is switched based on the turning on and off of the fuel dilution flag XS by this fuel dilution degree calculating routine. This is the same as it is for the apparatus according to the first exemplary embodiment.

In addition to the effects listed in (1) and (2) in the first exemplary embodiment, the apparatus according to the second exemplary embodiment, which controls the fuel injection timing with the modes described above, also displays the following effects.

(6) The rate of increase (i.e., the fuel dilution amount per unit of time) $\Delta FD$ of the fuel dilution fuel dilution degree FDSUM is calculated at a constant, predetermined time cycle T based on a parameter that correlates with the amount of fuel adhered to the cylinder inner peripheral face 18. The current fuel dilution degree FDSUM is then updated based on this calculated rate of increase $\Delta FD$, and this updated fuel dilution degree FDSUM is learned as the new fuel dilution degree FDSUM. Therefore, the fuel dilution degree FDSUM, together with the increase in the fuel dilution degree FDSUM, can be accurately and appropriately estimated, so the effects described in (1) and (2) above can be displayed even more effectively.

(7) Further, during learning, not only the rate of increase (i.e., the fuel dilution amount per unit of time) $\Delta FD$ of the fuel dilution degree FDSUM, but also the rate of decrease (i.e., the fuel evaporation amount per unit of time) $\Delta FV$ of the fuel dilution degree FDSUM, are calculated based on the lubricating oil temperature estimated from the coolant temperature at engine startup THWST and the fuel injection quantity sum value after engine startup QINJSUM. Then, the fuel dilution degree FDSUM is updated and learned based on both the rate of increase $\Delta FD$ and the rate of decrease $\Delta FV$. Therefore, the fuel dilution degree FDSUM, together with the increase and decrease in the fuel dilution degree FDSUM, is able to be estimated even more appropriately.

(8) Further, because parameters that strongly correlate with the amount of fuel adhered to the cylinder inner peripheral face 18, such as the fuel injection quantity, the fuel injection timing, and the engine temperature, in particular, are selected as the parameters that correlate with the amount of fuel adhered to the cylinder inner peripheral face 18, the fuel dilution degree FDSUM is able to be estimated even more accurately.

The apparatus according to each exemplary embodiment described above is able to be realized by changing part of the structure and control process as follows. In the process of step S200 in FIG. 3 according to the first exemplary embodiment, it is determined whether the amount of fuel evaporated from the overall lubricating oil following a rise in the average temperature of the overall lubricating oil has risen to a predetermined amount by comparing the engine coolant temperature THW with the predetermined temperature THWH. Here, the following method, for example, may also be used to more accurately obtain the fuel evaporation amount. The initial value of the lubricating oil temperature may be estimated based on the coolant temperature at engine startup THWST and the amount of increase in that temperature may be estimated based on the fuel injection quantity sum value after the engine has started (the intake air quantity sum value may be substituted for this if homogeneous combustion is selected as the combustion mode). Then, the fuel evaporation amount can be obtained based on the lubricating oil temperature obtained as the sum value of the initial value and the temperature increase amount.

In the first exemplary embodiment, as a determination condition for determining that the current engine operation corresponds to a cold short trip, the coolant temperature at engine startup THWST must be equal to, or less than, the predetermined temperature THWL and the intake air quantity sum value after engine startup GASUM must be equal to, or less than, the predetermined quantity GASUML. This determination condition may be changed, however. For example, the engine operation time from after engine startup until engine stop may be measured, and it may be determined that the current engine operation corresponds to a cold short trip when the coolant temperature at engine startup THWST is equal to, or less than, the predetermined temperature THWL and the engine operating time is equal to, or less than, a predetermined value.

In the first exemplary embodiment, the predetermined quantity GASUML that is compared to the intake air quantity sum value after engine startup GASUM may also be set variably according to the coolant temperature at engine startup THWST. More specifically, it is preferable that the predetermined quantity GASUML be set so as to become smaller the higher the coolant temperature at engine startup THWST.

In the first exemplary embodiment, the dilution degree counter value C counts up by a predetermined amount $\alpha$. Here, because the fuel dilution amount tends to increase the greater the difference between the predetermined temperature THWL and the coolant temperature at engine startup THWST (e.g., THWL−THWST), a configuration in which the predetermined amount $\alpha$ is made to increase the greater this difference is also effective. Also, in the same way, the predetermined amount $\alpha$ may be made to increase the greater the difference between the predetermined quantity GASUML and the intake air quantity sum value after engine startup GASUM (e.g., GASUML−GASUM). Further, a configuration in which the predetermined $\alpha$ is a set variably based on both of these differences is also effective.

In the first exemplary embodiment, the dilution degree counter value C counts down by a predetermined amount $\beta$. Here, because the fuel evaporation amount tends to increase the greater the difference between the engine coolant temperature THW and the predetermined temperature THWH (e.g., THW−THWH), the predetermined amount $\beta$ may also be made to increase the greater this difference becomes.

In the first exemplary embodiment and the modified form thereof described above, when determining whether the current engine operation corresponds to a cold short stop, the intake air quantity sum value after engine startup GASUM is compared with the predetermined quantity GASUML corresponding to that intake air quantity sum value after engine startup GASUM. However, the fuel injection sum value after engine startup may be substituted for the intake air quantity sum value after engine startup GASUM.

In each of the foregoing exemplary embodiments, a case is illustrated in which only the fuel injection timing is changed. Alternatively, however, the fuel injection pressure, in addition to the fuel injection timing, may be changed by appropriately changing the discharge amount of the fuel pump that supplies fuel to the delivery pipe 24, for example. More specifically, it is also possible to decrease the rate at which the fuel is injected and thereby inhibit fuel from adhering on the cylinder inner peripheral face 18 by forcibly reducing the fuel injection pressure when fuel dilution has increased to the point where, if it progresses any further, the resultant adverse effects will not be able to be ignored any longer, such as when the fuel dilution flag XS has been set to "ON."

In each of the foregoing exemplary embodiments, an example is illustrated in which the fuel injection timing for the intake stroke is the only object of control and homogeneous combustion in which intake stroke injection is executed is presumed. Alternatively, however, fuel injection timing during the compression stroke may also be made the object of control during semi-stratified combustion in which a two stage injection is executed, for example. In this case, the fuel injection timing for the compression stroke is set to a timing farther to the retard side than normal, on the condition that the fuel dilution flag XS is set to "ON." As a result, the area of the cylinder inner peripheral face 18 to which fuel can adhere can be reduced, thereby making it possible to inhibit fuel dilution caused by fuel adherence.

In addition, it is also possible to inhibit fuel dilution caused by fuel adherence by changing the division ratio of the injected fuel (i.e., the ratio of the fuel injection quantity during the intake stroke to the fuel injection quantity during the compression stroke), for example, in two-stage injection during semi-stratified combustion. More specifically, it is preferable to compare the distance between the piston top face 15 and the nozzle hole of the fuel injection valve 20 in the fuel injection during the intake stroke with the distance between the piston top face 15 and the nozzle hole of the fuel injection valve 20 in the fuel injection during the compression stroke, and then change that division ratio so that the fuel injection quantity of the fuel injection in which that distance is longer increases.

Also, the control method for inhibiting adhesion of fuel onto the cylinder inner peripheral face 18 by changing the division ratio of the fuel injection quantity in this way is not limited to the two-stage injection during semi-stratified combustion described in each exemplary embodiment. For example, the control method can also be applied in the same way to a construction in which fuel is divided and injected during the intake stroke. In this case, it is preferable to set the division ratio of the fuel injection quantities such that the fuel injection quantity becomes larger the farther toward the advance side the fuel injection timing.

In each of the foregoing exemplary embodiments, the fuel injection timing is changed to two stages based on the fuel dilution flag XS. Alternatively, however, it is also effective to monitor the dilution degree counter value C in the first exemplary embodiment and monitor the fuel dilution degree FDSUM in the second exemplary embodiment, and control the fuel injection timing of the intake stroke injection so that it is set gradually to the advance side as the dilution degree counter value C and the fuel dilution degree FDSUM, respectively, increase. As a result, it is possible to even more flexibly and accurately control the fuel injection timing according to the actual degree of adverse effects on the internal combustion engine by both the deterioration in the exhaust gas emissions caused by fuel adhering to the top of the piston and fuel dilution caused by fuel adhering to the cylinder inner peripheral face.

Also, when the engine is cold, the fuel increase amount process according to the engine coolant temperature THW, for example, may be executed. In this case, a restriction can be applied to this process, such as reducing the increase amount value of the fuel increase amount process or prohibiting the fuel increase amount process, when the adverse effects would be unable to be ignored if the fuel dilution were to progress any farther, such as when the fuel dilution flag XS is set to "ON." It is also possible to inhibit fuel dilution by controlling the fuel injection quantity in this way.

In each of the foregoing exemplary embodiments, the degree of fuel dilution is estimated based on the presumption that the fuel dilution and the evaporation of fuel from the lubricating oil fundamentally occur only when the engine is operating. While it is true that the amounts of both fuel dilution and fuel evaporation tend to increase more when the engine is operating than when it is stopped, fuel evaporation actually also occurs even when the engine is stopped. Therefore, for example, in addition to timing the engine stop time, the lubricating oil temperature at engine startup (or at engine stop) may be estimated, and the fuel evaporation amount while the engine is stopped may also be estimated based on the engine stop time and the lubricating oil temperature. When the degree of fuel dilution is estimated, it can be estimated even more accurately if the fuel evaporation amount during engine stop is also taken into consideration.

The combustion heat generated during each fuel injection also changes according to the air-fuel ratio during fuel injection and the ignition timing and the like, in addition to the intake air quantity and the fuel injection quantity. Therefore, it is also effective to take this into consideration when calculating the intake air quantity sum value after engine startup GASUM in the first exemplary embodiment, and when calculating the fuel injection quantity sum value after engine startup QINJSUM in the second exemplary embodiment. More specifically, to further increase the accuracy of estimating the amount of combustion heat and lubricating oil temperature, it is also effective to use a method such as placing emphasis on the intake air quantity sum value after engine startup GASUM and fuel injection quantity sum value after engine startup QINJSUM according to the air-fuel ratio and ignition timing and the like, and adding them up.

In each of the foregoing exemplary embodiments, the engine coolant temperature THW, coolant temperature at engine startup THWST, fuel injection quantity sum value after engine startup QINJSUM and the like are estimated based on the operating state of the engine. Alternatively, however, a sensor that directly detects the lubricating oil temperature may be provided, for example, and the aforementioned various controls may be performed based on the detected results. In this case, it is preferable that the temperature of lubricating oil which is at a high temperature that correlates with the average temperature of the overall lubricating oil, such as the temperature of the lubricating oil within the oil pan 74, be detected.

What is claimed is:

1. A fuel injection control apparatus for an in-cylinder injection internal combustion engine in which fuel is directly injected into a cylinder of the internal combustion engine, the fuel injection control apparatus comprising:

a dilution degree estimating portion that estimates a degree of fuel dilution by fuel of overall lubricating oil supplied to lubricate the internal combustion engine; and a control portion that controls a fuel injection mode so as to inhibit dilution by fuel of the lubricating oil when the estimated degree of fuel dilution is larger than a predetermined value;

wherein the dilution degree estimating portion estimates the degree of fuel dilution based on an operating history of the internal combustion engine.

2. The fuel injection control apparatus according to claim 1, wherein the control portion changes a fuel injection timing as the fuel injection mode so as to inhibit the fuel dilution.

3. The fuel injection control apparatus according to claim 2, wherein the control portion selects the fuel injection timing from among a plenty of fuel injection timings that are set in advance.

4. The fuel injection control apparatus according to claim 3, wherein the fuel injection timing is set based on a fuel injection quantity and a rotational speed of the internal combustion engine, or an intake air quantity and the rotational speed of the internal combustion engine.

5. The fuel injection control apparatus according to claim 2, wherein the fuel injection timing is a timing on an advance side.

6. The fuel injection control apparatus according to claim 5, wherein the fuel injection timing is when a piston in the cylinder is near top dead center.

7. The fuel injection control apparatus according to claim 1, wherein the dilution degree estimating portion monitors whether the internal combustion engine was operating in state in which the degree of fuel dilution increases and estimates the degree of fuel dilution based on that monitored history.

8. The fuel injection control apparatus according to claim 7, wherein the dilution degree estimating portion estimates a total amount of combustion heat generated within the cylinder from engine startup until engine stop based on an operating state of the engine, and determines that the internal combustion engine was operating in a state in which the degree of fuel dilution increases when an engine temperature at engine startup is equal to, or less than, a predetermined temperature and the estimated total amount of combustion heat is equal to, or less than, a predetermined amount.

9. The fuel injection control apparatus according to claim 8, wherein the dilution degree estimating portion determines that the total amount of combustion heat is equal to, or less than, the predetermined amount when an intake air quantity sum value or a fuel injection quantity sum value, from engine startup to engine stop, is equal to, or less than, a predetermined value.

10. The fuel injection control apparatus according to claim 7, wherein:

the dilution degree estimating portion determines whether the degree of fuel dilution is decreasing or increasing based on a temperature of the lubricating oil or a parameter that correlates with that temperature, and estimates the degree of fuel dilution based on a size of a counter value which is counted up when a history of operation of the internal combustion engine in a state in which the degree of fuel dilution increases has been generated, and which is gradually counted down when it has been determined that the degree of fuel dilution is decreasing; and the control portion executes a control according to the fuel injection mode based on the size of the counter value.

11. A fuel injection control apparatus for an in-cylinder injection internal combustion engine in which fuel is directly injected into a cylinder of the internal combustion engine, the fuel injection control apparatus comprising:

a dilution degree estimating portion that estimates a degree of fuel dilution by fuel of overall lubricating oil supplied to lubricate the internal combustion engine; and a control portion that controls a fuel injection mode so as to inhibit dilution by fuel of the lubricating oil when the estimated degree of fuel dilution is larger than a predetermined value;

wherein the dilution degree estimating portion estimates the degree of fuel dilution by calculating a rate of increase in the degree of fuel dilution based on a parameter that correlates with an amount of fuel adhered to a cylinder inner peripheral face due to fuel injection, sequentially updating the degree of fuel dilution based on the calculated rate of increase, and learning this updated degree of fuel dilution.

12. The fuel injection control apparatus according to claim 11, wherein the dilution degree estimating portion selects as the parameter that correlates with the amount of fuel adhered to the cylinder inner peripheral face at least one of a fuel injection quantity, a fuel injection timing, and an engine temperature, when calculating the rate of increase in the degree of fuel dilution.

13. The fuel injection control apparatus according to claim 11, wherein the dilution degree estimating portion estimates the degree of fuel dilution by further estimating a fuel evaporation amount, which is the amount of fuel evaporated from the overall lubricating oil, based on a temperature of the lubricating oil or a parameter that correlates with that temperature, calculating a rate of decrease in the degree of fuel dilution based on the estimated fuel evaporation amount, sequentially updating the degree of fuel dilution based on the calculated rate of decrease and the calculated rate of increase, and learning the updated degree of fuel dilution.

14. A fuel injection control method for an in-cylinder injection internal combustion engine in which fuel is directly injected into a cylinder of the internal combustion engine, the control method comprising the steps of:

estimating a degree of fuel dilution by fuel of overall lubricating oil supplied to lubricate the internal combustion engine;

controlling a fuel injection mode so as to inhibit dilution by fuel of the lubricating oil when the estimated degree of fuel dilution is larger than a predetermined value; and estimating the degree of fuel dilution based on an operating history of the internal combustion engine.

15. A fuel injection control method for an in-cylinder injection internal combustion engine in which fuel is directly injected into a cylinder of the internal combustion engine, the control method comprising the steps of:

estimating a degree of fuel dilution by fuel of overall lubricating oil supplied to lubricate the internal combustion engine;

controlling a fuel injection mode so as to inhibit dilution by fuel of the lubricating oil when the estimated degree of fuel dilution is larger than a predetermined value; and estimating the degree of fuel dilution by calculating a rate of increase in the degree of fuel dilution based on a parameter that correlates with an amount of fuel adhered to a cylinder inner peripheral face due to fuel injection, sequentially updating the degree of fuel dilution based on the calculated rate of increase, and learning this updated degree of fuel dilution.

* * * * *